Oct. 12, 1954
J. H. JACOBS ET AL
2,691,392
POWER SAW-AUTOMOTIVE TYPE
Filed May 25, 1949
3 Sheets-Sheet 1
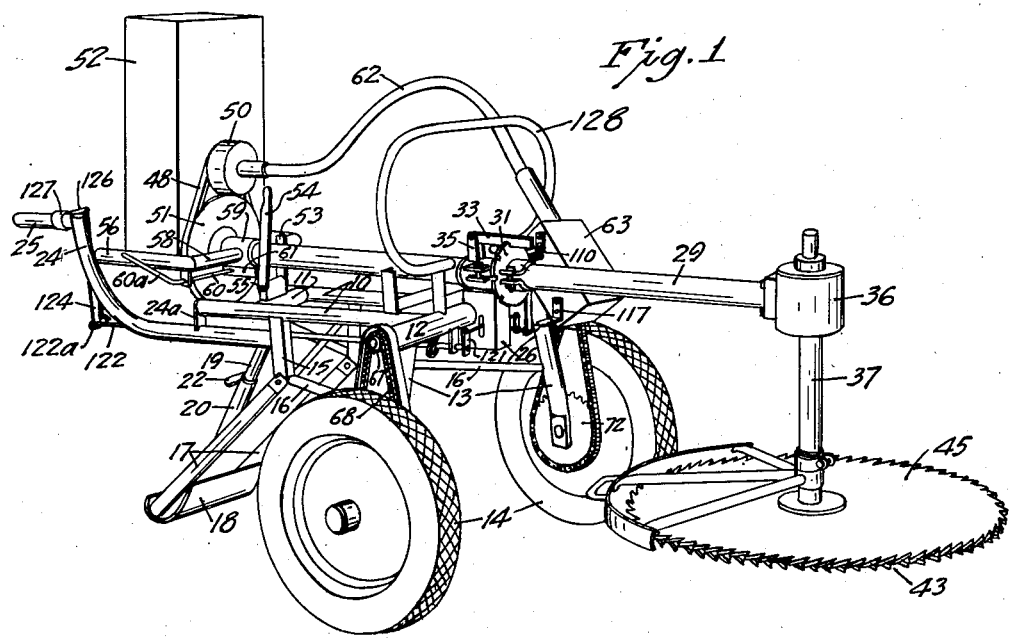
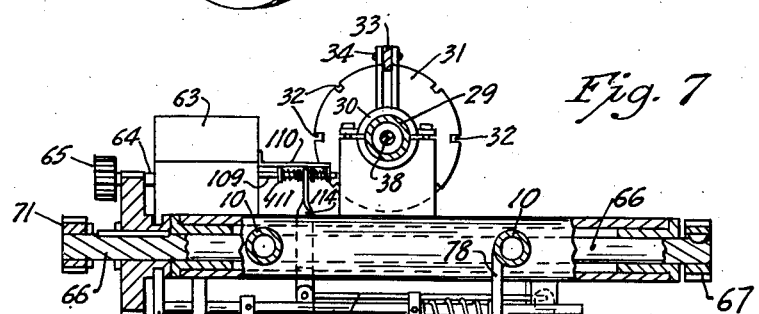
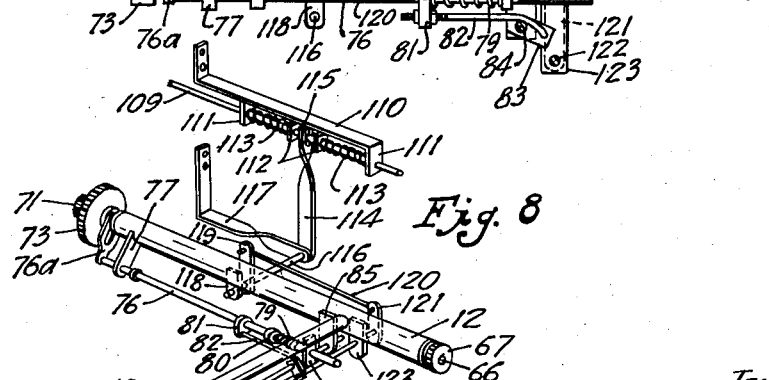
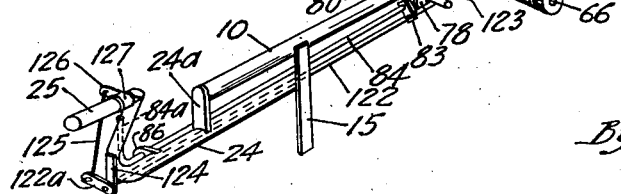
Inventors
Joseph H. Jacobs
Marcellus L. Jacobs
By Williamson & Williamson
Attorneys

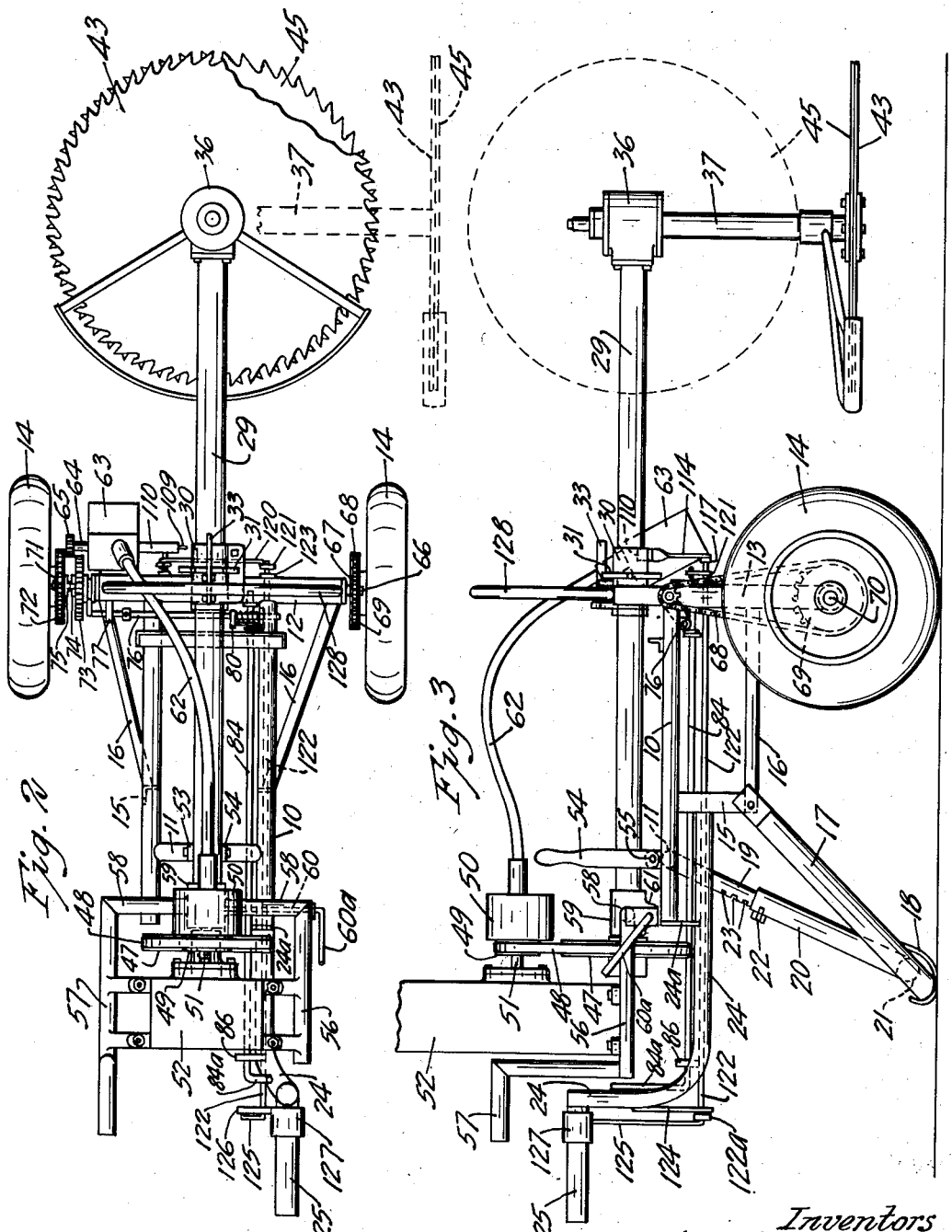

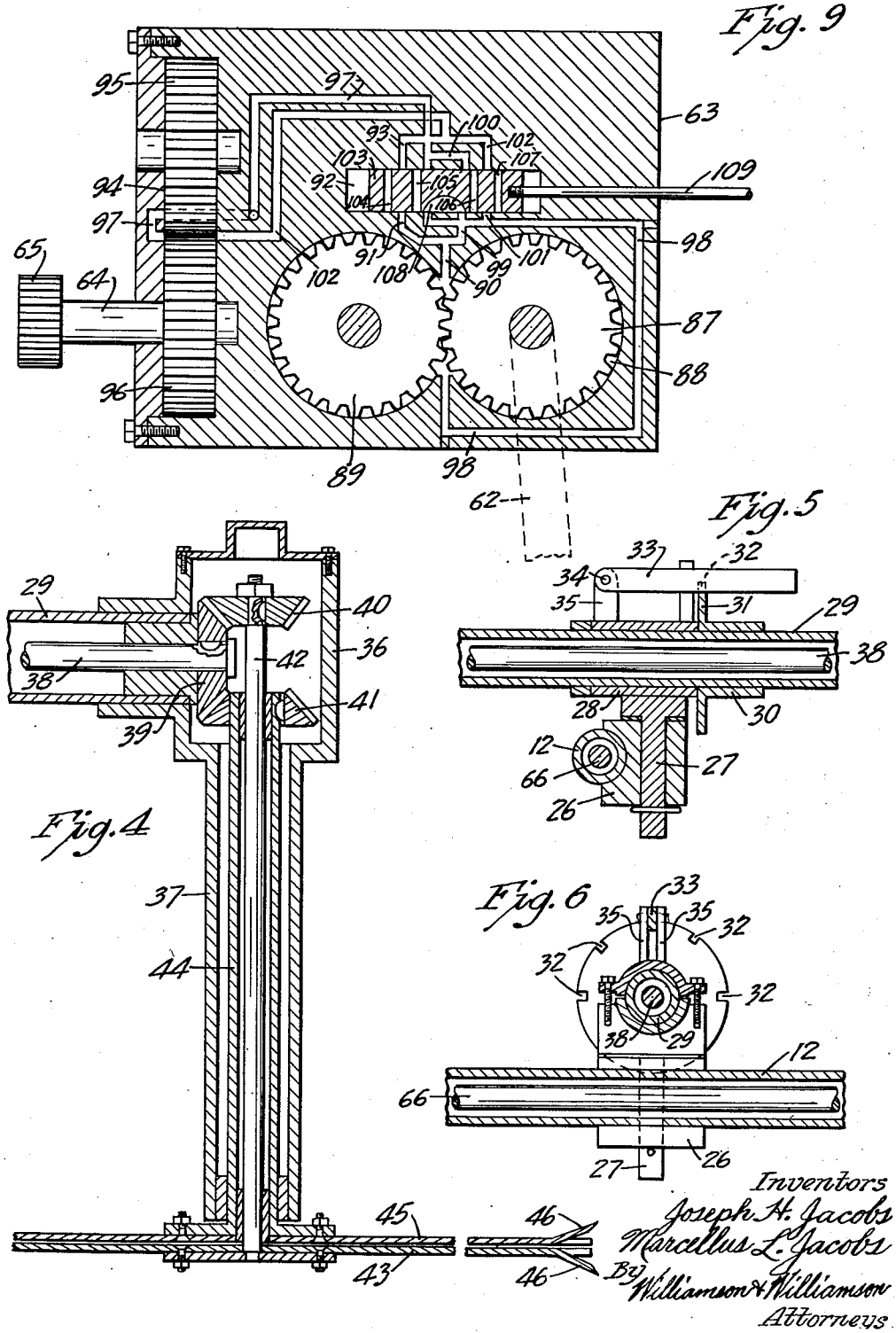

Patented Oct. 12, 1954

2,691,392

UNITED STATES PATENT OFFICE 2,691,392

POWER SAW—AUTOMOTIVE TYPE

Joseph H. Jacobs and Marcellus L. Jacobs, Minneapolis, Minn.

Application May 25, 1949, Serial No. 95,332

2 Claims. (Cl. 143—43)

This invention relates to power tools which are automotive, and more particularly to power driven and wheel supported saws.

It is an object of the invention to provide a power saw which is supported upon a wheel frame wherein at least one of the wheels is power driven, and wherein control means is provided for the power driven wheel which will automatically stop the rotation thereof if the drive control is released by the operator. This is provided in order to prevent injury to the operator in the event he should stumble and fall when the machine is moving toward him or when it otherwise gets out of control.

Another object of the invention is to provide an automotive tool, and preferably a saw, which in addition to the above recited means for automatically stopping the rotation of the wheels, will lock them against roation as soon as the operator releases the control.

A further object of the invention is to provide a machine of this type wherein the power driven wheel or wheels can be freed from the power drive mechanism so that the device can be readily swung to different positions without interference from the drive connection.

A further object of the invention is to provide a power driven saw which is wheel supported wherein the wheels as well as the saw are power driven and either the wheels or the saw or both can be selectively disconnected from the source of power in a convenient manner.

Still a further object of the invention is to provide a power driven saw which is conveniently run by an internal combustion engine, and wherein a speed responsive clutch is provided which will discoinect the saw from the engine when the engine speed is reduced to a predetermined speed such as an idling speed.

Another object of the invention is to provide means whereby the saw can be conveniently set to different angular positions, depending upon the angle of cut desired and/or the slope of the ground upon which the saw carriage rests.

The above and other objects and advantages of the invention will more fully appear from the following description made in connection with the accompanying drawings, wherein like reference characters refer to the same parts throughout the views, and, in which:

Fig. 1 is a perspective view of an embodiment of the invention.

Fig. 2 is a plan view thereof.

Fig. 3 is a side elevational view with the saw blade shown in alternate positions in full and dotted lines.

Fig. 4 is an enlarged fragmentary sectional view of a portion of the saw head and its drive.

Figs. 5 and 6 are enlarged fragmentary sectional views taken at right angles to each other of the adjustable saw positioning means.

Fig. 7 is an enlarged fragmentary partially in sections of a portion of the saw carriage wheel drive and control therefor, Fig. 8 (Sheet 1) is an enlarged fragmentary perspective view of a portion of the saw carriage wheel drive and control.

Figure 9 is a vertical section taken through a suitable embodiment of hydraulic drive mechanism for driving, locking and freeing the propelling wheels 14.

The machine includes a pair of longitudinal spaced parallel frame members 10 having a rearward cross-member 11 and having their forward ends connected to a transverse axle housing 12. The housing 12 as best shown in Fig. 1 has a pair of downwardly extending portions 13, the lower ends of which carry suitable wheels 14.

Extending downwardly from the frame members 10 are brackets 15, which are connected at their lower ends to radius rods 16 which extend forwardly to the downwardly extending axle housing portions 13. Extending downwardly and rearwardly from the brackets 15 are frame supporting legs 17. A curved skid 18 connects the lower ends of said legs.

Pivotally connected to the frame cross-member 11 is a jack element 19 which slidably fits into a complementary element 20, the lower end of which is pivotally connected to a cross-member 21, which extends between the lower portions of the legs 17. Pivotally mounted on the jack portion 20 is a lever 22 which extends partially through the tubular jack portion 20 and is selectively received in notches 23 in the jack portion 19 to provide longitudinal adjustment of said jack.

Extending rearwardly from the right hand or near side of the frame is a handle bar 24. The handle bar is connected to the bracket 15 at its forward end and also by means of a strap 24a to the rear end of the right hand frame member 10. The handle bar 24 is shown in Fig. 3 to extend rearwardly and thence upwardly, and a drive control handle 25 extends horizontally rearwardly from the rear end of the handle bar 24. This drive control will be explained below in more detail.

Mounted on the axle housing 12 intermediate its ends is a swivel block 26, in which is pivotally mounted a swivel pin 27. The upper end of the pin 27 has a bearing sleeve 28 thereon. Extending through and rotatable in the sleeve 28 is a drive shaft housing 29 which extends longitudinally of the machine for a considerable distance and also for some distance forwardly of the wheels 14. Adjacent the forward end of the sleeve 28 is a collar 30 having a flange 31 thereon, said flange having a plurality of notches 32 to selectively receive a locking lever 33 which is pivotally connected at 34 to a pair of lugs 35 which extend upwardly from the bearing sleeve 28. As a result the power shaft housing sleeve 29 can be rotated to different positions and locked therein.

The forward end of the saw blade housing 29 has a gear box 36 mounted thereon and extending from said gear box is a tubular housing 37 which lies at a right angle to the generally horizontal housing 29. Journaled in the housing 29 is a saw blade drive shaft 38 whose forward end is provided with a bevel gear 39 which meshes with co-operative bevel gears 40 and 41, all three of said gears being located in the gear box 36.

The bevel gear 40 is mounted on a shaft 42, which extends through the housing 37 and on its outer end is mounted a circular saw blade 43. The bevel gear 41 is mounted on a tubular shaft 44 which lies concentrically between the shaft 42 and the housing 37, and its outer end has a circular saw blade 45 mounted thereon. The two blades 43 and 45, by reason of the bevel gear arrangement at 40 and 41, are rotated in opposite directions by the bevel gear 39 on the shaft 38. Certain of the teeth of the blades 43 and 45 are set outwardly at an angle in directions away from each other as shown at 46 in Fig. 4.

The main blade drive shaft 38 extends rearwardly through the horizontal housing 29 and has a pulley 47 thereon. The pulley 47 is connected by a belt 48 to a pulley 49 on a speed responsive clutch 50 of a type well known in the clutch art. Preferably it is actuated by flyweights which will disengage the pulley 49 from a motor drive shaft 51 on an internal combustion engine 52, when the speed of the engine is reduced, for example, to its normal idling speed.

The housing 29 about the saw drive shaft 38, adjacent to rear end, extends between a pair of upstanding arms 53 and 54, which are connected to swing together about a pivotal axis 55. When the arms 53 and 54 are extended upwardly they will hold the tubular housing 29 against lateral swinging movement about its vertical pivot 27 on the axle housing 12. The restraining arm 54 is longer than the arm 53 and provides a handle whereby said arms can be swung downwardly to release the saw drive shaft housing 29 and permit it and the saw head to be swung about said pivot pin 27.

The internal combustion engine 52 is mounted on a pair of sub-frame members 56 and 57. These sub-frame members have a forward crossmember 58 which carries a split sleeve 59, the latter being mounted upon the extreme rear end of the horizontal tubular housing 29. A threaded rod 60 extends through lugs 61 on the sleeve and when rotated will tighten the sleeve on the drive shaft housing 29. The rod 60 has a bent end 60a so that it can be more readily tightened and released. When the sleeve 59 is released from the tubular housing 29, said housing can be rotated relative to the internal combustion engine 52, so that the engine will remain upright regardless of the angular position to which the saw blades are turned.

Mounted on the outer end of the engine drive shaft 51 is a flexible shaft 62 which leads to a hydraulic pump housing 63, which in turn is suitably mounted on the transverse axle housing 12. A shaft 64 extends from the hydraulic pump housing 63 and carries a pinion gear 65.

The vehicle axle housing 12 has an axle 66 therein. One end of the axle carries a sprocket 67 which is carried by a chain 68 to a sprocket 69 on a stub shaft 70 which also carries one of the wheels 14.

The other end of the axle 66 has a sprocket 71 rotatably mounted thereon, said sprocket being connected by a chain to a larger sprocket 72 in the same manner as described in connection with the other wheel, the difference being that the previously mentioned sprocket 67 is mounted on the axle 66 for rotation therewith.

Slidable on the axle 66 but keyed thereto is a pinion gear 73 which can be shifted into and out of mesh with the pinion 65 on the short power shaft 64 which extends from the hydraulic pump housing 63. One side of the pinion 73 is provided with one-half of a toothed clutch element 74 which co-operates with a clutch element 75 on the sprocket 71 on the axle 66. When the pinion 73 is meshed with the pinion 65, the clutch elements 74 and 75 will be engaged. Since the pinion 73 is keyed to the axle 66 it will rotate said axle and the sprocket 67 and the clutch 74 and 75 will rotate the sprocket 71; when in the position shown in Fig. 2 neither wheel is connected for driving movement.

Fig. 8 shows the mechanism for shifting the sprocket 73. It includes a rod 76 carrying a shifting fork 76a slidably supported by lugs 77 and 78 on the axle housing 12 and one of the main frame side members 10 respectively. The rod 76 has a spring 79 thereon interposed between the lug 78 and a collar 80 on the rod 76. There is another collar 81 on said rod and it is connected by a link 82 to a short lever 83 rigidly mounted upon an elongated rod 84 which extends from a lug 85 on the axle housing 12 to a journal or lug 86 at the lower rear portion of the handle bar 24. It will be seen in Fig. 8 that the right hand end of the link 82 is bent downwardly at an angle so that when the rod 84 is rotated by meshing of its bent end 84a, said right hand end of the link 82 will go over center in its movement relative to the rod 84 as the elements are turned in a clockwise direction. This will lock the elements in position against the expansive action of the spring 79 and will hold the pinion 73 out of engagement with pinion 65 and will also hold apart the clutch elements 74 and 75.

Fig. 9 illustrates an embodiment showing a hydraulic drive mechanism such as could be contained in the housing 63. The flexible power shaft 62 is adapted to connect with a pump gear element 87, which is rotatably mounted in a chamber 88 in the casting or housing 63. It meshes with a pump gear element 89. An outlet conduit 90 has a branch 91 which communicates with a valve chamber 92. At the opposite side of the chamber and in alignment with the conduit branch 91 is a conduit 93 which is in communication with a gear chamber 94 in which a pair of meshed gears 95 and 96 are rotatably mounted, the gear 96 having the stub shaft 64 extending therefrom and carrying the wheel drive pinion 65.

Opposite the point of communication of the conduit 93 with a gear chamber 94 is a return conduit connection 97, which communicates with the valve chamber 92. Opposite this point of communication with said valve chamber is a return conduit section 98 which is adapted to bring liquid back to the opposite side of the meshed teeth of the gears 87 and 89 from the liquid discharge conduit 90.

Said discharge conduit 90 has another branch 99 which communicates with the valve chamber 92 and opposite it is a conduit 100 which connects with the conduit 97.

There is a branch conduit 101 which connects the return conduit 98 with a conduit 102 at the opposite side of the valve chamber 92. The conduit 102 connects with the conduit branch 93.

In the valve chamber 92 is a slidable valve body 103 having ports 104, 105 and 106 and 107 therethrough. There is also a flow reversing passage 108 in one side of the valve body 103.

When the valve body 103 is moved longitudinally in its chamber 92 to align the port 104 with conduits 91 and 93, it will also align the port 105 with conduits 97 and 98. In this position of the valve liquid will be forced by the pump gears 87 and 89 through conduit 91, port 104, and conduit 93 to one side of the meshed gears 95 and 96, causing said gears to be rotated. As liquid passes through the meshed teeth it is returned through conduit 97, port 105 and conduit 98 to the inlet side of the pump gears 87 and 89.

When the valve 103 is shifted to align the port 106 with conduits 99 and 100 the fluid moving from the pump gears 87 and 98 will be forced against the meshed gears 95 and 96 from the opposite side or in a reverse direction from that just described above. Fluid will return from gears 95 and 96 through conduit 102 and port 107 to the conduit 101 and thence to the return conduit 98, port 107 being aligned with said conduits 102 and 101.

When the valve 103 is set in the position shown in Fig. 9, liquid flowing from the pump gears 87 and 89 will flow through conduits 90 and 99 and the reverse flow or by-pass cavity in the valve to the return conduit 98. In this position none of the ports 104 through 107 are aligned with any conduit. This is an idling position of the pump.

The valve member 103 has an operating rod 109 connected thereto. This rod is slidably carried by a bracket 110 suitably secured to the pump housing 63. The rod 109 slides through lock 111 which forms part of the bracket 110. Spring stops 112 are mounted on the rod 109 to move longitudinally therewith. Compression springs 113 are located on the rod 109, there being a spring between each set of lugs 111 and 112. A lever 114 has a forked end 115 which lies about the valve operating rod 109. Said lever 114 is mounted on the end of a shaft 116, which is rotatably supported by a bracket 117 connected to the pump housing 63 and a bracket 118 extending downwardly from the axle housing 112. A crank arm 119 is rigidly mounted on the shaft 116 and is pivotally connected by a link 120 to a crank arm 121 rigidly mounted on the end of a shaft 122 which extends rearwardly to a point adjacent rear end of the frame of the machine. The shaft 122 has its forward end rotatably supported by a bracket 123 on the axle housing 12. The shaft extends through the tubular handle member 24 and thence out through the wall thereof at the point where said tubular handle is bent upwardly. The outwardly extending rear end of the shaft 122 is rotatably supported by a bracket 124 which is connected to the handle 24. A crank arm 122a is rigidly mounted on the end of the shaft 122 and it is pivotally connected by a link 125 to a crank arm 126 which is rotatably carried on the upper horizontal portion of the handle 24. A sleeve 127 is rotatable with the crank arm 126 so that when the sleeve is turned the entire above described linkage to the hydraulic valve member 103 can be shifted.

When the hand clip or sleeve 127 is shifted in one direction about the end of the handle 24 it will, through the linkage 126 down through 116, oscillate the lever 114. This will cause it to engage one of the spring stops 112 and shift the valve rod 109 in one direction. Obviously partial rotation of the handle sleeve 127 in the other direction will move the valve rod operating lever 114 and the rod and valve in the other direction to the forward or reverse setting of the valve as the case may be.

When the handle sleeve 127 is released by the operator the spring 113, which is under compression, will expand axially and return the valve rod 109 to a neutral position where the two springs 113 are balanced. Consequently, whether the machine is being driven in a forward or reverse direction, as soon as the operator releases the handle sleeve 127 the hydraulic drive will be disconnected. It should also be noted that when this occurs the valve 103 will be in a position shown in Fig. 9, wherein the conduit to and from the driven gears 95 and 96 will be shut off, and said gears will be locked in position. This being true, the entire wheel drive is locked so that the wheels can not rotate. This is a safety feature which is of extremely great importance in a machine of the type described, and it is impossible for the machine to move as long as the operator does not hold the handle sleeve 127 in a forward or reverse driving position.

From the foregoing description it will be seen that we have provided a power driven saw which is automotive and which is extremely simple and safe to operate. The internal combustion engine can be kept running but when it is throttled down to an idling speed the saw blades will be disconnected by the centrifugal clutch 50. Furthermore, if the saw blades become pinched as when cutting a tree, they will slow down the motor speed and cause the centrifugal clutch to disconnect the saw from the engine.

The saw can be set to any angle by means of the mechanism described above. It can cut horizontally or vertically or at intermediate angles, depending upon the number of notches 32 which are formed in the flanged collar 31. The saw can also be swung about its vertical pivot 32 and the entire unit can be rocked about the axle 66 for vertical swinging cuts when the blades are in the position shown in dotted lines in Fig. 3.

The hydraulic drive has been described above and the safety control, therefore, has also been brought out. Shifting of the pinion 73 to disengage it from the pinion 65 and to disengage the clutch elements 74 and 75 is provided so that the wheels 14 will be free for independent rotation when sharp turns are required, such as when maneuvering the machine into position relative to a tree to be cut.

As soon as the saw is placed in position the pinion 73 is meshed with the pinion 65 and the hydraulic valve 103 is set in the idling or locked position shown in Fig. 9, so that the saw will be firmly held and the wheels can not creep over the ground.

The rear leg 17 and its jack elements 19 and 20 permit the machine to be levelled on uneven ground and the skid 18 is provided when the machine is travelling such as when cutting a patch through brush.

A brush guard 128 is shown extending upwardly from the axle housing 12 to prevent brush from falling on and entangling with the flexible shafting 62 and other parts of the apparatus.

It will, of course, be understood that various changes may be made in the form, details, arrangement and proportions of the various parts without departing from the scope of my invention.

What we claim is:

1. In a mobile, self-propelled power-cutting machine such as a power saw for cutting standing and felled timber in advance of a propelling vehicle, a vehicle frame, powered wheels for supporting said frame, an elongated saw-mounting mounted for free swinging on a vertical axis extending longitudinally of said frame and projecting some distance beyond the forward end thereof, a power driven rotary saw mounted at the forward end of said mounting, said saw through its mounting and said self-propelled, wheeled frame being adapted to be advanced against material to be cut, by the propulsion of said frame through said driven wheels during horizontal swinging of said saw, a motor on said frame and connected for driving said rotary saw, a hydraulic power transmission unit interposed between said motor and at least two of said wheels for driving and controlling the saw, said transmission unit including mechanism for shifting driving connections from a neutral, non-driving position to a wheel-driving position, a single, oscillatory hand-control for controlling application of driving power to said wheels in variable relations and for also controlling locking of said wheels when the operator's hand is released therefrom, a valve in said hydraulic transmission adapted to, when closed, cause locking of said wheels and consequently stopping of the travel of the machine, spring means for normally urging said valve to closed position when said handle control member is released and connections between said mechanism and said valve and including said oscillatory handle for releasing said valve when said drive-connecting mechanism is actuated by said handle.

2. In a mobile power saw for cutting standing and felled timber and the like, a frame, wheels for supporting said frame, an elongated saw mounting extending longitudinally of said frame and projecting some distance beyond the forward end thereof, a power driven, rotary saw mounted at the forward end of said mounting and having driving connections supported in said mounting, said saw through its mounting and said wheeled frame being adapted to be advanced against material to be cut by the propulsion of said frame through driving of said wheels, a motor mounted on said frame and connected for driving said rotary saw, power take-off mechanism connected with said motor for driving at least one of said wheels, a hydraulic transmission unit interposed between said power take-off mechanism and any of said wheels to be driven, said hydraulic unit including a pump having forward and reverse flow conduits connected thereto, a valve associated with said conduits and shiftable from a neutral, non-driving position to forward and reverse driving positions, said valve being related to said conduits to lock power take-off from said unit and to consequently lock said wheels when shifted to a predetermined position, spring means for normally urging said valve to said locked power-takeoff position, clutch connections between said power take-off mechanism and at least one of said wheels, an oscillatory hand control member mounted in an accessible position on said vehicle frame, connections between said control member and said valve for shifting said valve against the action of said spring through hand control and connections between said clutch and said wheels for normally maintaining said clutch in normal position but shiftable through a finger control member adjacent said handle to disengage said clutch whereby normally during travel and operation of the device, release of the operator's hand from said hand control member locks the wheels and whereby when desired, shifting of said second finger control member will release said wheels for sharp turning manually of the machine.

References Cited in the file of this patent
UNITED STATES PATENTS

| Number | Name | Date |
|---|---|---|
| 1,516,502 | Rowntree | Nov. 25, 1924 |
| 1,624,663 | Jacker | Apr. 12, 1927 |
| 2,330,996 | Rivers | Oct. 5, 1943 |
| 2,365,408 | Hillyer | Dec. 19, 1944 |
| 2,377,303 | Acton | June 5, 1945 |
| 2,461,188 | Stoner | Feb. 8, 1949 |
| 2,462,314 | Fuqua | Feb. 22, 1949 |
| 2,463,232 | Zimicki | Mar. 1, 1949 |
| 2,601,752 | Rose | July 1, 1952 |